US006802917B1

(12) United States Patent
Tomantschger et al.

(10) Patent No.: US 6,802,917 B1
(45) Date of Patent: *Oct. 12, 2004

(54) PERFORATED CURRENT COLLECTORS FOR STORAGE BATTERIES AND ELECTROCHEMICAL CELLS, HAVING IMPROVED RESISTANCE TO CORROSION

(75) Inventors: Klaus Tomantschger, Mississauga (CA); David L. Limoges, Etobicoke (CA); Peter K. Lin, Toronto (CA); Gino Palumbo, Etobicoke (CA)

(73) Assignee: Integran Technologies Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,531

(22) Filed: May 26, 2000

(51) Int. Cl.$^7$ .................................................. C22F 1/12
(52) U.S. Cl. ...................... 148/706; 429/226; 429/233; 429/245
(58) Field of Search .................. 148/706; 429/245, 429/226, 233

(56) References Cited

U.S. PATENT DOCUMENTS

| | | | |
|---|---|---|---|
| 1,675,644 A | 7/1928 | Dean ........................... 148/706 |
| 3,853,626 A | 12/1974 | Daniels, Jr. et al. ............. 29/2 |
| 3,888,703 A | * 6/1975 | Tilman et al. |
| 3,926,247 A | 12/1975 | Geiger et al. ................ 164/263 |
| 3,953,244 A | 4/1976 | Prengaman ................. 148/706 |
| 3,959,016 A | 5/1976 | Tsuda ............................ 29/2 |
| 4,151,331 A | 4/1979 | Hug et al. ..................... 429/94 |
| 4,534,025 A | 8/1985 | Floyd .......................... 429/245 |
| 4,753,688 A | * 6/1988 | Myers ......................... 148/400 |
| 5,131,451 A | 7/1992 | Ashok et al. .................. 164/46 |
| 5,298,350 A | 3/1994 | Rao ............................ 429/245 |
| 5,434,025 A | * 7/1995 | Rao et al. ..................... 429/245 |
| 5,462,109 A | 10/1995 | Vincze et al. ................ 164/479 |
| 5,518,064 A | 5/1996 | Romanowski et al. ........ 164/453 |
| 5,604,058 A | 2/1997 | Wirtz .......................... 429/225 |
| 5,611,128 A | 3/1997 | Wirtz ............................. 29/2 |
| 5,691,087 A | 11/1997 | Rao ............................ 429/245 |
| 5,702,543 A | 12/1997 | Palumbo ..................... 148/592 |
| 5,816,088 A | 10/1998 | Yamada ......................... 72/53 |
| 5,817,193 A | 10/1998 | Palumbo ..................... 148/325 |
| 5,874,186 A | 2/1999 | Rao ............................ 429/242 |
| 5,932,120 A | 8/1999 | Mannava ................ 219/121.85 |
| 6,003,589 A | 12/1999 | Folder ......................... 164/428 |
| 6,057,059 A | 5/2000 | Kwok .......................... 429/235 |
| 6,086,691 A | * 7/2000 | Lehockey et al. ........... 148/706 |
| 6,342,110 B1 | * 1/2002 | Palumbo ..................... 148/400 |
| 6,592,686 B2 | 7/2003 | Palumbo ..................... 148/400 |

FOREIGN PATENT DOCUMENTS

| | | |
|---|---|---|
| DE | 2758940 | 7/1979 |
| EP | 0 933 438 A1 | 8/1999 |
| GB | 1597270 | 9/1981 |
| JP | 54056928 | 5/1979 |
| JP | 406267544 | * 9/1994 |
| WO | WO 00/60677 | 10/2000 |
| WO | WO 01/26171 A1 | 4/2001 |
| WO | WO 01/90433 A2 | 11/2001 |

OTHER PUBLICATIONS

U.S. patent application Publication 2002/0088515, Aust et al., Jul. 11, 2002.*
Abdel—Reihim, M.; Preibisch, B.; Reif, W., Structure and Mechanical Propesties of Lead Alloys for Expanded Metal Grids After Deformation and Recrystallization, Metall (Beslin) (1984) 38(5), 407–11, (abstract only), 1984.*
G. Palumbo et al., "Grain Boundary Design and Control for INtergranular Stress Corrosion Resistance" Scripta Metallurgica et Materialia, 25, pp. 1775–80, (1991).
E. M. LeHockey et al., "On the Relationship between Grain–Boundary Character Distribution and Intergranular Corrosion" Proceedings of Microscopy and Microanalysis, 1996, San Francisco Press Inc.
Abstract of JP 62177868A, Aug. 4, 1987, Matsushita Electric Industrial Co., Ltd.
JP 59 107068 (Hitachi Seisakusho KK) Jun. 21, 1984.
JP 59 013057 A (Tokyo SHibaura Denki KK) Jan. 23, 1984.
US 2003/0165742A1, G. S. Mann, Sep. 4, 2003.
US 2003/0183312A1, Lu Zhang, Oct. 2, 2003.
"Secondary Recrystallization in Copper", in Metal Transactions, vol. 185, Aug. 1949, pp. 501–514 (Kronberg, M.L. et al.).
"The Structure of High–Angle Grain Boundaries", in Acta Metallurgica, vol. 14, Nov. 1966, pp. 1479–1484 (Brandon, D.G.).

* cited by examiner

*Primary Examiner*—Sikyin Ip
(74) *Attorney, Agent, or Firm*—Ridout & Maybee LLP

(57) ABSTRACT

A process for enhancing chemical stability and corrosion resistance is described for perforated current collectors made by continuous production processes for use in electrochemical cells, including storage batteries such as lead-acid batteries. The process relies on utilizing a strip processing method, selected from the group of reciprocating expansion, rotary expansion and punching, to perforate the solid metal strip to form a grid or mesh, as a deformation treatment. The perforation-deformation treatment is followed in rapid succession by a heat-treatment to obtain a recrystallized microstructure in the current collector and optionally by quenching to rapidly reduce the temperature to below approximately 80° C. The process yields an improved microstructure consisting of a high frequency of special low $\Sigma$ CSL grain boundaries (>50%), exhibiting significantly improved resistance to intergranular corrosion and cracking. Perforated current collectors produced with this process from a solid lead-alloy strip exhibit superior growth and corrosion properties when employed as positive grids in a lead-acid battery.

22 Claims, No Drawings

PERFORATED CURRENT COLLECTORS FOR STORAGE BATTERIES AND ELECTROCHEMICAL CELLS, HAVING IMPROVED RESISTANCE TO CORROSION

FIELD OF THE INVENTION

This invention relates to a process for improving the resistance to intergranular corrosion and cracking of perforated current collectors, in particular to the production of lead-alloy grids for use as the positive plates in a lead-acid battery. The process takes advantage of conventional processes employed to perforate flat metal sheet to form grid or mesh-type current collectors, to serve additionally as a bulk deformation treatment, which is then immediately followed by an applied heat-treatment and, optionally, subsequent quenching to yield a recrystallized microstructure in the metal which possesses significantly improved resistance to undesired corrosion and growth.

DESCRIPTION OF PRIOR ART

In the production of grid- or mesh-form current collectors of the kind used in electrochemical cell applications, e.g. for storage batteries, a flat metal sheet is typically perforated using a continuous process. An electrochemically active material is typically then pasted into the resulting perforated grid, the paste is flash cured using an in-line furnace and, subsequently, the continuous pasted grid structure is cut into individual battery plates.

A typical application of this conventional process is in the production of lead-acid batteries. For the purpose of simplification, the process specifically illustrated in what follows is directed to the production of lead-alloy grids for use in lead-acid batteries. However, similar methods are used in the manufacture of metallic current collectors for other electrochemical cells and batteries as well. Some of these are disclosed in the prior patents and applications described below, all of which are hereby incorporated by reference for their teachings relative to the manufacture of metallic current collectors.

Two-step processes are frequently used to prepare perforated current collectors using a continuous approach. In the first step, flat solid sheets are produced by a variety of strip casting or slab casting followed by rolling processes. The flat solid strips produced are typically wound into coils. Coils are typically stored until needed.

In the second step the strip coils are transferred to another process-line where the perforation and usually the active material pasting take place. This process generally starts with an uncoiler that unwinds the flat solid lead coils and feeds the strip into a perforation apparatus. Commonly used perforation techniques include reciprocating expanders, rotary expanders and grid punching systems. In the case of expanders the lead strip is slit and stretched to form a continuous expanded mesh. In the case punching is employed, typically rectangular coupons are punched out of the strip to create a continuous perforated grid-like sheet. The perforation processes apply mechanical stress to the lead foil by stretching and/or pressing the base material, but in all cases the overall strip deformation, as expressed by the ratio of the strip thickness before and after the perforation are kept under 10%, typically under 7.5%. The perforated strip created by any one of the listed processes travels downstream in the process to a paster, typically followed by a flash cure oven and is then cut into individual grids in tab blanker and plate dividers.

To enhance the longevity of non-consumable electrodes, current collectors and other metallic articles used in electrochemical cells, a variety of metal, metal alloys and composites have been developed. They include lead, copper, nickel, aluminum, iron, silver, zinc, lithium and their respective alloys. In many applications the environment in which the metallic articles are exposed to is highly corrosive and research is conducted to enhance the stability, e.g. by reducing the corrosion induced weight loss and growth experienced, particularly when the metallic article is exposed to oxidizing potentials and corrosive electrolytes. As many of the batteries in question are mass-produced at high speeds, continuous fabricating and processing of current collectors are becoming the manufacturing method of choice.

The prior art describes numerous methods for producing current collectors using continuous or semi-continuous processes:

Various technologies exist for producing a flat metal or metal alloy strip. They include horizontal casting processes as described by Geiger in U.S. Pat. No. 3,926,247 (1975) and Vincze in U.S. Pat. No. 5,462,109 (1995) in which a strip is cast on a chilled casting surface of a rotating drum from a pool of molten metal. Vertical casting processes, using a twin roll arrangement with an adjustable gap, are described by Folder in U.S. Pat. No. 6,003,589 (1999) and Romanowski in U.S. Pat. No. 5,518,064 (1996). Additional equipment suitable for the production of solid strips includes belt casters as described by Ashok in U.S. Pat. No. 5,131,451(1992). Numerous commercial processes exist where a slab or strip is reduced to size by sequential rollers. Prengaman in U.S. Pat. No. 3,953,244 (1976) describes stable wrought lead-calcium-tin alloy sheet which is prepared by casting, cold working the casting, preferably using rolling to one quarter of the original thickness, within two to three days after casting and heating aged work pieces sufficiently to dissolve the precipitated calcium phases.

Various processes have been described to perforate such a continuous strip to form a suitable current collector. They include reciprocating expanders such as described by Daniels in U.S. Pat. No. 3,853,626 (1974). In this process a solid ribbon or strip of lead is fed into a continuous, in-line, guillotine-type, dual expansion machine and therein expanded along its longitudinal edges to form two reticulated portions and leaving a central unexpanded portion from which a grid, header and lug are subsequently formed. The reticulated portions are uniformly stretched in a direction perpendicular to the central portion by embossed forming rolls and matched counter rolls. Finally, the reticulated portion is rolled to twist and flatten the nodes joining skeletal elements.

Tsuda in U.S. Pat. No. 3,959,016 (1976) describes a manufacturing method for a lead-antimony alloy-grid plate for batteries comprising the fabrication of a rolled lead-alloy foil, stepwise press-punching the foil to obtain a perforated plate and hardening the plate using heat-treatment. In this method, the hardening of the lead alloy is accomplished either by preparing the rolled lead-alloy plate through a hot rolling process or by carrying out a heat-treatment before or after the press-punching process to increase the hardness of the lead grid plate for the purpose of attaining an increased strength to facilitate the battery assembly and to enable a reduction of strip thickness while maintaining dimensional tolerance and strength. Tsuda goes through great effort to avoid or at least minimize any deformation of the remaining grid strands, typically induced by punching processes, and achieves his objective by employing a multi-step punching process. The rolled lead alloy plate is passed through a funnel furnace at 210 to 220° C. for between 30 and 90 minutes, optionally water quenched, and hardened by a subsequent natural aging process over 24 hours.

Hug in U.S. Pat. No. 4,151,331 (1979) discloses a lead-acid battery grid having a network of integrally connected strands of lead in which a portion of the strands are offset and project from one face of the grid while a second portion of strands projects and are offset to the other opposed face of the grid. The perforated structure is formed from a lead foil by a punching process. Hug indicates that it is known that lead-acid battery grids are formed from lead sheets by slitting and stretching to form an-expanded mesh. He indicates that the expansion process involves considerable cold-working of the lead which leads to corrosion of the grid, and is therefore undesirable. Hug goes further stating that perforated lead-grids, in which a flat lead sheet of substantially non-distortable thickness is perforated, stamped, rolled or slit to form apertures therein defining a mesh or grid structure, experiences reduced corrosion rates, as compared to expanded grids since less cold working of the lead takes place in the forming process. Hug therefore emphasizes that minimizing deformation in the perforation processes leads to superior chemical stability in the resulting grids.

Lehockey et al. In U.S. Pat. No. 6,086,691, assigned to the owner of the present application, describes lead and lead-alloy anodes for electrowinning metals such as zinc, copper, lead, tin, nickel and manganese from sulfuric-acid solutions, whereby the electrodes are processed by at least two repetitive cycles of cold deformation in the range of 30–80% and a heat treatment of 10–30 minutes at 180 to 300° C. to induce recrystallization and to achieve at least 50% special grain boundaries.

Palumbo in C.I.P. Ser. No. 08/835,926 (1999), also assigned to the owner of rights in the present application, describes lead and lead-alloys with enhanced creep and/or intergranular corrosion resistance, especially for lead acid batteries. The lead-alloy is subjected to at least one processing cycle comprising cold working the lead alloy to reduce the thickness thereof by a substantial amount, preferably in excess of 10% and subsequently annealing the lead-alloy for a time and temperature sufficient to effect recrystallization to substantially increase the special grain boundary fraction.

It is a teaching common to the prior art on the manufacture of current collectors that any mechanical deformation imposed during metal strip perforation/expansion has a detrimental effect on the corrosion performance of the resulting perforated current collector structure. In other words, it has been commonly understood to be a requirement for the optimization of corrosion performance that mechanical deformation at that stage of manufacture be minimized or eliminated.

However, the two above-noted commonly assigned patent applications do teach the use of substantial mechanical deformation, followed by a heat-treatment appropriate for the specific application, to recrystallize the grain structure.

The inventors of the present invention have discovered that the mechanical stress and much more limited deformation imposed on a metal strip in the usual application of a perforation process at near-ambient temperature to perforate the strip, when followed by a heat-treatment step below the melting point of the metal or metal-alloy of which the strip is composed, for up to twenty minutes, leads to the formation of a recrystallized grain structure and to the increase in special grain boundary populations to greater than 50%, leading to a substantial improvement in the corrosion and growth resistance of the perforated non-consumable electrodes and current collectors which are made. Prior to treatment according to the present invention, the population of special grain boundaries in the metal-alloy is typically about 15%.

Special grain boundaries are highly resistant to intergranular degradation processes such as corrosion and cracking and are defined on the basis of the well-established "Coincidence Site Lattice" model of interface structure (Kronberg and Wilson, Trans. Met. Soc., AIME, 185 501 (1949), as lying within $\Delta\theta$ of $\Sigma$ where $\Sigma \leq 29$ and $\Delta\theta \leq 15°\Sigma^{-1/2}$ (Brandon, Acta Metall., 14,1479 (1966)).

SUMMARY OF THE INVENTION

It is a principal object of this invention to provide an economical continuous process enabling the production of a perforated structure for use as current collectors in galvanic cells, which exhibits superior anti-corrosion properties and longevity.

It is a further object of the present invention to substantially increase the special grain boundary populations ($F_{sp}$) in the web or wire sections of the perforated structure to over 50% to enhance chemical properties and corrosion performance.

With a view to achieving these objects, there is provided a method of producing a metallic current conductor for use in an electrochemical or galvanic cell which comprises perforating a solid, flat metal or metal-alloy strip, using a continuous process which results in at least a local deformation of the remaining perforated structure. The perforated, formed strip is then annealed at a temperature below the melting point of the metal-alloy to yield a recrystallized microstructure. The deformation inherent in perforating the precursor metal strip, followed by annealing and recrystallization, increases the special grain boundaries in the microstructure, to the benefit of operating properties of the final article, i.e. the metallic current collector. The best properties are obtained when conditions are applied that raise the level of special grain boundaries in the microstructure to at least 50%.

DESCRIPTION OF THE PREFERRED EMBODIMENT

Metallic current collectors, made from lead, copper, nickel, aluminum, iron, silver, zinc, lithium and their respective alloys, are well known in the art of electrochemical cell designs and a variety of forms, shapes and sizes, manufactured using a variety of processing techniques are employed. Most continuous processes used in e.g. the production of lead-acid battery grids rely on producing a coil of a flat solid strip using various commercially available processes.

Scientists continue to explore means of enhancing the corrosion performance of current collectors used in electrochemical cells typically exposed to electrolyte at various electrochemical potentials. Various metal, metal alloys and composites have been used in a variety of applications to improve longevity. Means of enhancing the corrosion properties by employing new compositions, surface coatings and treatments have also been described.

As is known by those skilled in the metallurgical art, cold working involves mechanical deformation of an article at a low enough temperature that dislocations are retained, leading to a structure of nonrecrystallized, deformed grains. This invention relies on cold-working the article by a strip expansion or punching process, resulting in strip thickness reduction of less than 10%, typically less than 7.5% and more typically less than 5%, followed by a suitable annealing treatment below the melting point of said metal or alloy.

The heat-treatment is carried out at temperatures and times sufficient to allow recrystallization to occur, which depends largely on the chemical composition of the test article. In the case of lead-alloys, depending on the composition, generally 100 to 300° C. for a time period of between 10 seconds and 20 minutes is required. For heat-treatment times exceeding 30 minutes substantial grain growth was observed which adversely affects the corrosion behavior, and is therefore unsuitable. In the case of other metals and alloys, the heat-treatment is carried out in the range of 0.50 to 0.95 of the melting point of the material expressed in Kelvin.

If the perforation process used is a two-step process, e.g. in the case of rotary expansion, whereby the strip is perforated in the first step using rotary dies and thereafter, the strip is pulled apart laterally, the annealing oven can optionally be placed between the slitting and the expansion step. The advantage of this approach is that the strip, although perforated, is narrower than the expanded mesh and easier to guide through the annealing oven at high speed. As the lateral expansion follows the heat treatment, dimensional stability in the furnace is less critical compared to cases, where the mesh has been expanded to its final dimension prior to being transported through the annealing furnace. It is also possible to pre-expand the perforated strip prior to annealing, followed by stretching to the final dimension, to improve the dimensional tolerances.

A quenching step optionally follows the heat-treatment. This step is required to cool the perforated current collector strip down to typically below 80° C., thereby increasing the yield strength to a sufficient level that the material does not get distorted in any of the downstream processes, particularly the pasting operation.

Also optionally, cold working and annealing of the precursor metal strip or plate can be carried out prior to perforation, as described in aforementioned U.S. patent application Ser. No. 08/835,926. Cold working of the flat solid strip can include rolling, extruding, forging and the like.

In the case of lead-acid battery manufacture, the lead coils feeding the expander/paster line are typically consumed every 15 to 30 minutes. At this point the process stops for typically three to five minutes to place a new coil on the uncoiler and to join or weld the new strip to the last coil. Thereafter the process is started up again. Strip-accumulators are available from various suppliers, e.g. the Kent Corporation of North Royalton, Ohio, which uncoil the metal strip at a faster rate than they feed the expander with. Consequently a strip buffer is generated, typically capable of feeding the expander/paster line for another three to five minutes which is the time required to join the end of the current coil to the next coil. The employ of the accumulator eliminates downtime and also ensures that the in-line heat-treatment received by the perforated strip is uniform.

The following description illustrates preferred embodiments of this invention.

EXAMPLE 1

A lead strip was produced using conventional strip forming techniques. The nominal composition of the alloy was 0.029% Ca, 0.73% Sn, 0.062% Ag, the remainder being Pb. In the case of gravity casting the strip was cast to a thickness of 0.035". In the case of rolling the strip was gravity cast to 0.080", then rolled to 0.035". The resulting 0.035" thick lead-alloy strips were subsequently fed into a rotary expander to form a mesh with about 10 openings per square inch. The resulting mesh sections were used as controls. Following the expansion the thickness of the strip sections at the center and the borders was measured and determined to be 0.035" in all cases. A portion of the mesh sections was subsequently exposed to a heat-treatment at 250° C. for 10 minutes. Bare grid samples were subjected to a standard corrosion test for 20 days (E. M. Valeriote, J. Sklarchuk, M. S. Ho, Proceedings of the Symposium on Advances in Lead-Acid Batteries, Electrochem. Society 84–14(1984) 224–240). The conditions were sulfuric-acid specific gravity 1.28 g/ml, 75° C. 200 mV overpotential. Table 1 lists the results:

TABLE 1

Pb, 0.029% Ca, 0.73% Sn, 0.062% Ag, 0.035", 20 days
Various processes with and without heat-treatment of mesh

|  | CEx | CExHT | CREx | CRExHT | CRHTEx | CRHTExHT |
|---|---|---|---|---|---|---|
| Weight loss [mg/cm$^2$] | 73 | 56 | 88 | 43 | 82 | 65 |
| Vertical Growth [%] | 6.2 | 1.1 | 7.7 | 0.2 | 3.3 | 1.6 |
| Area Growth [%] | 8.9 | 2.1 | 8.0 | 0.8 | 0.5 | 2.0 |
| $F_{sp}$ [%] | 29 | 64 | 15 | 81 | 37 | 65 |
|  | Cast Control | Invention | Cast/Roll Control | Invention | Cast/Roll Heat Treatment Control | Invent |

In Table 1, the column headings, C, R, Ex and HT stand for cast, rolled, expanded and heat treated, respectively. Thus, for example, the data in the fourth column relate to a sequence of processing in which a casting step is followed by a rolling step which is followed by an expansion step and, finally, a heat treatment step, according to the present invention.

EXAMPLE 2

A lead strip was produced using conventional strip forming techniques. The nominal composition of the alloy was 0.036% Ca, 0.63% Sn, 0.036% Ag, the remainder being Pb. The strip was gravity cast to 0.080", then rolled to 0.040". The 0.040" lead-alloy strips were all heat-treated at 250° C. for 10 minutes. Thereafter the strips were cooled down to room temperature and rotary expanded to form a mesh as described in Example 1. No thickness reduction of the strip occurred in the expander. A portion of the mesh was subsequently heat-treated at 250° C. for 10 minutes. Representative samples were corrosion tested as described in Example 1. Table 2 lists the results:

TABLE 2

Pb, 0.036% Ca, 0.63% Sn, 0.036% Ag, 0.040", 20 days

|  | Vertical Plate Plate Growth [%] | Plate Weight Loss Loss [mg/cm$^2$] | Fsp [%] Web |
|---|---|---|---|
| Control (CRHTEx) | 9.0 | 67 | 22 |
| This Invention (CRHTExHT) | 2.4 | 44 | 68 |

EXAMPLE 3

A lead strip was produced by extrusion and heat treated for 10 minutes at 250° C. Thereafter the strip was rolled to a final thickness of 0.035". The nominal composition of the alloy was 0.09% Ca, 1.25% Sn, the remainder being Pb. The lead-alloy strip was subsequently fed into a rotary expander as described in Example 1. A portion of the mesh was subsequently exposed to a heat-treatment at 250° C. for 10 minutes. Bare grid samples were subjected to a standard corrosion test as described in Example 1. Table 3 lists the results:

TABLE 3

Pb, 0.09% Ca, 1.25% Sn, 0.035", 20 days

|  | Vertical Plate Plate Growth [%] | Plate Weight Loss Loss [mg/cm$^2$] | Fsp [%] Web |
|---|---|---|---|
| Control (XHTREx) | 8.1 | 82 | 15 |
| This Invention (XHTRExHT) | 1.5 | 51 | 81 |

Similar results were obtained when the reciprocating expansion or punching was used to perforate the strip. In-line heat-treatment times of 30 seconds to one minute were determined to be sufficient in most cases to obtain the desired recrystallized structure. Suitable materials processed this way include lead, copper, nickel, aluminum, iron, silver, zinc, lithium and their respective alloys. In the case of lead strip, suitable alloying elements used were selected from the group of Ca, Sr, Ba, Sb, As, Al, Sn, Ag and Bi.

We claim:

1. A method of manufacturing a metallic current collector for use in an electrochemical or galvanic cell, comprising the steps of:
    (i) perforating a solid, flat metal strip using a continuous process that results in deformation of the strip at least locally near the perforations, wherein said deformation expressed by the ratio of the strip thickness before and after deformation is less than 10%; and
    (ii) immediately following step (i), annealing the perforated strip at a temperature below the melting point of said metal or metal-alloy to yield a special grain boundary content of at least 50% in deformed portions of the strip; with the proviso that said metal consists of lead or lead alloyed with an element selected from the group consisting of Ca, Sr, Ba, Al, Sn, Ag, Bi, and combinations thereof.

2. The method according to claim 1, wherein said continuous process is a process of reciprocating expansion.

3. The method according to claim 1, wherein said continuous process is a process of rotary expansion.

4. The method according to claim 1, wherein said continuous process comprises punching perforations through said metal strip.

5. The method according to claim 1, wherein said step of annealing is carried out at a temperature between 100 and 300° C. for a duration of between 10 seconds and 20 minutes.

6. The method according to claim 5, wherein said metallic current collector is a lead-acid battery grid.

7. The method according to claim 1, further comprising the step, following step (ii), of quenching said perforated strip.

8. The method according to claim 1, further comprising the step, following step (ii), of cooling the perforated strip to a temperature below 80° C.

9. The method according to claim 1, wherein a strip accumulator is used for feeding said solid, flat metal strip into a perforator in step (i) to eliminate or reduce stoppages in said continuous process.

10. The method according to claim 1, wherein said solid, flat metal strip is heat-treated prior to carrying out step (i).

11. A method of manufacturing a metallic current collector for use in an electrochemical or galvanic cell, comprising the steps of:
    (i) perforating a solid, flat metal strip using a continuous process that results in deformation of the strip by less than 10% when expressed by the ratio of the strip thickness before and after perforation; and
    (ii) annealing the perforated strip at a temperature below the melting point of said metal or metal-alloy to yield a special grain boundary content of at least 50% in deformed portions of the strip;
    with the proviso that said metal consists of lead or lead alloyed with an element selected from the group consisting of Ca, Sr, Ba, Al, Sn, Ag, Bi, and combinations thereof.

12. A method of manufacturing a lead or lead alloy current collector for use in an electrochemical or galvanic cell, comprising the steps of:
    (i) perforating a solid, flat metal strip using a continuous process that results in deformation of the strip by less than 10% when expressed by the ratio of the strip thickness before and after perforation; and
    (ii) annealing the perforated strip at a temperature between 100° C. and 300° C. to yield a special grain boundary content of at least 50% in deformed portions of the strip;
    with the proviso that said metal consists of lead or lead alloyed with an element selected from the group consisting of Ca, Sr, Ba, Al, Sn, Ag, Bi, and combinations thereof.

13. In a process for producing a metallic current collector in the form of a grid or mesh for use in an electrochemical or galvanic cell which comprises the steps of:
    a) making a deformed strip by perforating a solid flat metal strip using a continuous process that results in deformation of the strip at least locally near the perforations whereby said strip is formed into a grid or mesh configuration having a deformed portion, said deformation, expressed by the ratio of the strip thickness before and after perforation, being less than 10%;
    b) pasting the deformed strip with an electrochemically active material;
    c) flash curing the paste; and then
    d) cutting said pasted deformed strip into individual current collectors;

wherein the improvement comprises:
an annealing step wherein the deformed strip is annealed prior to pasting by heating the metal of said deformed strip to cause the formation of a a special grain boundary content of at least 50% in said deformed portion; said heat treatment being performed at a temperature below the melting point of said metal for up to 20 minutes with the proviso that said metal consists of lead or lead alloyed with an element selected from the group consisting of Ca, Sr, Ba, Al, Sn, Ag, Bi and combinations thereof.

14. The method according to claim 13, wherein said continuous process is a process of reciprocating expansion.

15. The method according to claim 13, wherein said continuous process is a process of rotary expansion.

16. The method according to claim 13, wherein said continuous process comprises punching perforations through said metal strip.

17. The method according to claim 13, wherein said step of annealing is carried out at a temperature between 100 and 300° C. for a duration of between 10 seconds and 20 minutes.

18. The method according to claim 17, wherein said metallic current collector is a lead-acid battery grid.

19. The method according to claim 13, further comprising quenching said deformed strip after said annealing step.

20. The method according to claim 13, further comprising cooling the deformed strip to a temperature below 80° C. after said annealing step.

21. The method according to claim 13, wherein a strip accumulator is used for feeding said solid, flat metal strip into a perforator in step a) to eliminate or reduce stoppages in said continuous process.

22. The method according to claim 13, wherein said solid, flat metal strip is heat-treated prior to carrying out step a).

* * * * *